(12) United States Patent
Saito et al.

(10) Patent No.: US 11,518,365 B2
(45) Date of Patent: Dec. 6, 2022

(54) HYBRID VEHICLE CONTROL SYSTEM

(71) Applicant: MAZDA MOTOR CORPORATION, Hiroshima (JP)

(72) Inventors: Tadashi Saito, Aki-gun (JP); Yutaro Fukuda, Aki-gun (JP)

(73) Assignee: Mazda Motor Corporation, Hiroshima (JP)

(*) Notice: Subject to any disclaimer, the term of this patent is extended or adjusted under 35 U.S.C. 154(b) by 295 days.

(21) Appl. No.: 16/933,552

(22) Filed: Jul. 20, 2020

(65) Prior Publication Data
US 2021/0061258 A1 Mar. 4, 2021

(30) Foreign Application Priority Data
Aug. 29, 2019 (JP) .............................. JP2019-156340

(51) Int. Cl.
*B60W 20/40* (2016.01)
*B60W 10/02* (2006.01)
*B60W 10/06* (2006.01)
*B60W 10/08* (2006.01)
*B60W 50/00* (2006.01)

(52) U.S. Cl.
CPC ............ *B60W 20/40* (2013.01); *B60W 10/02* (2013.01); *B60W 10/06* (2013.01); *B60W 10/08* (2013.01); *B60W 2050/0026* (2013.01); *B60W 2510/0638* (2013.01); *B60W 2510/0685* (2013.01); *B60W 2540/10* (2013.01); *B60W 2556/10* (2020.02);
(Continued)

(58) Field of Classification Search
CPC ...... B60W 20/40; B60W 10/02; B60W 10/06; B60W 10/08; B60W 2050/0026; B60W 2510/0638; B60W 2510/0685; B60W 2540/10; B60W 2556/10; B60W 2710/02; B60W 2710/06

USPC ............................................................ 477/5
See application file for complete search history.

(56) References Cited

U.S. PATENT DOCUMENTS

2009/0234524 A1* 9/2009 Kim ...................... B60W 10/06
 701/22
2011/0246008 A1* 10/2011 Yoshida .................. F02D 29/06
 903/930
(Continued)

FOREIGN PATENT DOCUMENTS

EP 2525078 A2 11/2012
JP 2012086662 A 5/2012

OTHER PUBLICATIONS

European Patent Office, Extended European Search Report Issued in Application No. 20185511.1, dated Nov. 27, 2020, Germany, 9 pages.

*Primary Examiner* — Roger L Pang
(74) *Attorney, Agent, or Firm* — Alleman Hall Creasman & Tuttle LLP (57) ABSTRACT

In a hybrid vehicle control system, when a first traveling mode using torque of an electric motor is switched to a second traveling mode using torque of an engine, a controller performs an engine start control by applying an engagement pressure to a first clutch and by cranking the engine by the electric motor, so as to start the engine. Specifically, the controller obtains a predicted start time and an actual start time by the engine start control, and corrects the engagement pressure so as to decrease the engagement pressure applied to the first clutch at a subsequent time of starting the engine, when the actual start time is shorter than the predicted start time.

8 Claims, 7 Drawing Sheets

(52) U.S. Cl.
CPC ..... *B60W 2710/02* (2013.01); *B60W 2710/06* (2013.01)

(56) References Cited

U.S. PATENT DOCUMENTS

| | | |
|---|---|---|
| 2012/0292919 A1 | 11/2012 | Suzuki |
| 2013/0296109 A1* | 11/2013 | Nedorezov ........... B60W 10/08 477/5 |
| 2016/0046281 A1* | 2/2016 | Nedorezov ........... B60W 20/40 180/65.265 |
| 2018/0208173 A1 | 7/2018 | Gibson et al. |
| 2021/0339733 A1* | 11/2021 | Saito ................... B60W 30/182 |

\* cited by examiner

HYBRID VEHICLE CONTROL SYSTEM

BACKGROUND OF THE INVENTION

Field of the Invention

The present invention relates to a hybrid vehicle control system comprising an engine, an electric motor, and a clutch configured to switch between a transmission of torque between the engine and the electric motor, and a non-transmission of the torque.

Description of Related Art

Heretofore, in a hybrid vehicle which includes an engine and an electric motor as power sources and which is driven by at least one of a driving force of the engine and a driving force of the electric motor, there has been provided a technique in which the engine is cranked by the electric motor to start the engine.

For example, Patent Document 1 (Japanese Laid-Open Patent Publication 2012-86662 A) discloses a technique for setting an engine starting torque based on variations for each rotation stop position of the engine immediately before an engine start when the engine is started during traveling using only the torque of the electric motor. This technique is intended to set an optimum engine starting torque without excess or deficiency in order to complete the engine start within a predetermined time from an engine start request.

BRIEF SUMMARY OF THE INVENTION

Technical Problem

In the meanwhile, the hybrid vehicle, which includes the clutch for switching between the transmission of the torque between the engine and the electric motor and the non-transmission of the torque, comprises a traveling mode (hereinafter referred to as "first traveling mode") in which the clutch is set to a disengaged state and the hybrid vehicle travels by using the torque of the electric motor without using the torque of the engine, and a traveling mode (hereinafter referred to as "second traveling mode") in which the clutch is set to an engaged state and the hybrid vehicle travels by using at least the torque of the engine. The hybrid vehicle starts the engine by applying an engagement pressure (hereinafter referred to as "clutch engagement pressure") to the clutch so as to change the clutch from the disengaged state to the engaged state, and by cranking the engine by the electric motor, when the traveling mode of the hybrid vehicle is switched from the first traveling mode to the second traveling mode.

When the engine is started in order to switch the traveling mode from the first traveling mode to the second traveling mode as described above, it is desirable to apply an appropriate engagement pressure to the clutch. This is because it takes a long time to start the engine (the engine may not start in some cases) if the clutch engagement pressure is too low, while fuel efficiency deteriorates due to wasteful consumption of energy if the clutch engagement pressure is too high. That is, there is an optimum clutch engagement pressure for properly starting the engine.

It is thought that the optimum clutch engagement pressure varies depending on a crank position during the engine stop before the engine start, accuracy of the sensors used for the engine start, assembly accuracy of engine parts, a time-based deterioration, and parts variation. Therefore, it is difficult to accurately obtain the optimum clutch engagement pressure. Accordingly, the conventional techniques prioritize the engine start by applying the clutch engagement pressure that is considered to be sufficient to start the engine (in other words, the clutch engagement pressure that is higher than the optimum engagement pressure), without obtaining the optimum clutch engagement pressure. As a result, the above deterioration in fuel efficiency occurs due to the application of an unnecessarily high clutch engagement pressure.

The present invention has been made to solve the above conventional problem, and an object thereof is to provide a hybrid vehicle control system capable of applying an appropriate engagement pressure to a clutch provided between an engine and an electric motor, when the engine is started in order to switch from a traveling mode using the electric motor to a traveling mode using the engine.

Solution to Problem

In order to achieve the above object, the present invention provides a hybrid vehicle control system, including: an engine; an electric motor; a clutch configured to switch between a transmission of torque between the engine and the electric motor, and a non-transmission of the torque; and a controller configured to control the engine, the electric motor, and the clutch, wherein the controller is configured to: determine whether or not to switch a traveling mode of a hybrid vehicle from a first traveling mode in which the clutch is set to a disengaged state and the hybrid vehicle travels by using the torque of the electric motor without using the torque of the engine, to a second traveling mode in which the clutch is set to an engaged state and the hybrid vehicle travels by using at least the torque of the engine; perform a control for an engine start by applying an engagement pressure to the clutch so as to change the clutch from the disengaged state to the engaged state, and by cranking the engine by the electric motor, when the traveling mode of the hybrid vehicle is determined to be switched from the first traveling mode to the second traveling mode; calculate a predicted start time from a start of the control for the engine start to an end of the engine start; obtain an actual start time from the start of the control for the engine start to an actual end of the engine start; and correct the engagement pressure so as to decrease the engagement pressure which is applied to the clutch at the time of performing the control for a subsequent engine start, when the actual start time is shorter than the predicted start time.

In the present disclosure, when the engine is started in order to switch the traveling mode of the hybrid vehicle from the first traveling mode to the second traveling mode, the hybrid vehicle control system obtains the predicted start time and the actual start time by the control for the engine start (engine start control), and corrects the clutch engagement pressure so as to decrease the clutch engagement pressure applied to the clutch the next time that the engine is started, when the actual start time is shorter than the predicted start time. In other words, the hybrid vehicle control system calculates the predicted start time in consideration of various states, and corrects the clutch engagement pressure applied to the clutch by learning, in accordance with a time difference between the predicted start time and the actual start time, specifically, corrects the clutch engagement pressure to decrease the pressure when the actual start time is shorter than the predicted start time. Therefore, it is possible to optimize the clutch engagement pressure used for starting the engine at the time of switching from the first travel mode to the second travel mode, thereby suppressing deterioration in fuel efficiency due to an application of the clutch engagement pressure more than necessary.

Preferably, in the hybrid vehicle control system of the present disclosure, the controller is configured to calculate the predicted start time based on a crank position during an engine stop before the control for the engine start.

A start time of the engine greatly changes depending on a crank position (crank stop position) during the engine stop before the switch from the first travel mode to the second travel mode. This is because the torque (loss torque) required to start the engine changes depending on the crank stop position. Therefore, in the present invention, the predicted start time is calculated in consideration of the above change of the start time depending on the crank stop position. Therefore, it is possible to appropriately calculate the predicted start time in which an influence of the crank stop position is taken into consideration. Hence, the predicted start time can be obtained with high accuracy.

Preferably, in the hybrid vehicle control system of the present disclosure, when a request for accelerating the hybrid vehicle is issued by a driver, the controller is configured to make the engagement pressure applied to the clutch larger than when the request for accelerating the hybrid vehicle is not issued by the driver, in order to shorten a start time of the engine, under a condition that the traveling mode of the hybrid vehicle is determined to be switched from the first traveling mode to the second traveling mode.

According to the above configuration, when the request for accelerating is issued by the driver, a quick start of the engine can be appropriately prioritized. In other words, by starting the engine quickly, an acceleration request from the driver can be appropriately realized.

Preferably, in the hybrid vehicle control system of the present disclosure, the controller is configured to correct the engagement pressure so as to make a decreased amount of the engagement pressure larger, as an absolute value of a difference between the actual start time and the predicted start time becomes larger.

According to the above configuration, the clutch engagement pressure can be effectively optimized.

Preferably, in the hybrid vehicle control system of the present disclosure, the controller is configured to determine that the engine start ends when an engine rotation speed reaches a given value, and to calculate the predicted start time and obtain the actual start time.

According to the above configuration, the predicted start time and the actual start time are obtained by using a timing when the engine rotation speed reaches the given value, as a timing when the engine start ends. Therefore, the accuracy of the predicted start time and the actual start time can be appropriately ensured.

The above hybrid vehicle control system of the present invention can apply an appropriate engagement pressure to a clutch provided between an engine and an electric motor, when the engine is started in order to switch from a traveling mode using the electric motor to a traveling mode using the engine.

DETAILED DESCRIPTION OF THE INVENTION

With reference to the accompanying drawings, a hybrid vehicle control system in one embodiment of the present invention will now be described.

<Configuration of System>

Figure 1:
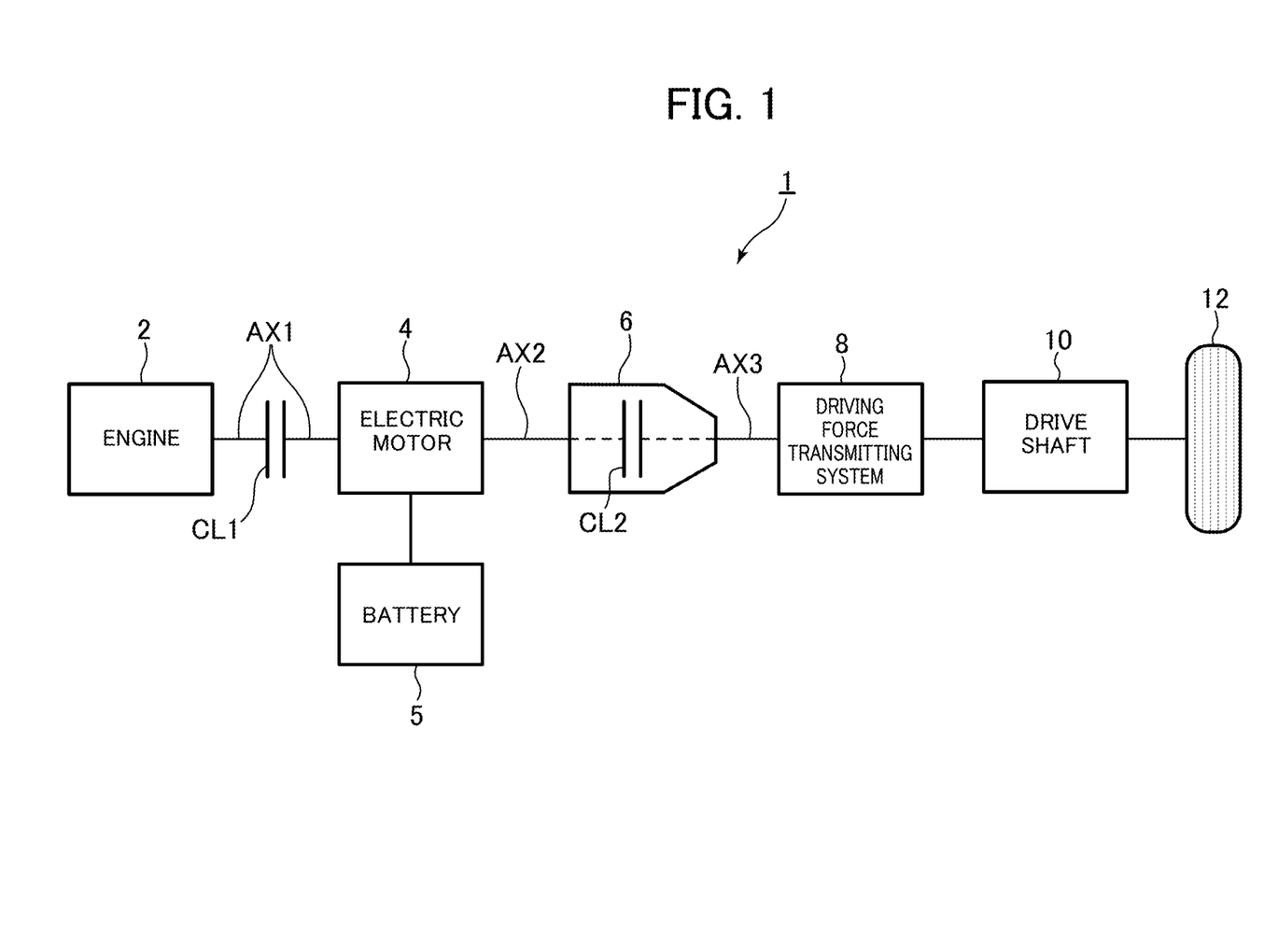
FIG. 1 is a schematic diagram depicting a configuration of a hybrid vehicle employing a hybrid vehicle control system in an embodiment of the present invention.

FIG. 1 is a schematic diagram depicting a configuration of a hybrid vehicle employing a hybrid vehicle control system in an embodiment of the present invention.

As shown in FIG. 1, a hybrid vehicle 1 comprises: an engine 2 (for example, a gasoline engine) which generates torque for driving the hybrid vehicle 1; an electric motor 4 which is provided downstream side of the engine 2 on a driving force transmitting path of the hybrid vehicle 1, and which generates torque for driving the hybrid vehicle 1; a battery 5 which exchanges electric power with the electric motor 4 via an inverter (not shown); a transmission 6 which is provided on the downstream side of the electric motor 4 on the driving force transmitting path of the hybrid vehicle 1, and which changes a rotation speed of the engine 2 and/or the electric motor 4; a driving force transmitting system 8 which transmits the torque from the transmission 6 to the downstream side; a drive shaft 10 which drives drive wheels 12 by the torque from the driving force transmitting system 8; and the drive wheels 12.

An output shaft of the engine 2 and a rotation shaft of the electric motor 4 are coaxially connected by a shaft AX1 via a first clutch CL1. By the first clutch CL1, it is possible to switch between a transmission of the torque between the engine 2 and the electric motor 4, and a non-transmission of the torque. For example, the first clutch CL1 is configured by a dry multi-plate clutch capable of changing a transmission torque capacity by continuously or stepwisely controlling a clutch operating oil flow rate and a clutch operating oil pressure by using a motor (not shown).

The rotation shaft of the electric motor 4 and a rotation shaft of the transmission 6 are coaxially connected by a shaft AX2. Typically, the transmission 6 has one or more planetary gears provided therein, and is an example of an automatic transmission which has a function of automatically switching gear stages (gear ratios) in accordance with a vehicle speed and an engine rotation speed. Further, the transmission 6 is provided with a second clutch CL2, and the second clutch CL2 can switch between a transmission of a torque between the upstream side of the transmission 6 (the engine 2 and the electric motor 4) and the downstream side of the transmission 6 (the drive wheels 12), and a non-transmission of the torque. For example, the second clutch CL2 is also configured by the dry multi-plate clutch capable of changing the transmission torque capacity by continuously or stepwisely controlling the clutch operating oil flow rate and the clutch operating oil pressure by using the motor (not shown). Generally, the second clutch CL2 is configured by a number of clutches used to switch various gear stages in the transmission 6.

The torque is input to the driving force transmitting system 8 via an output shaft AX3 of the transmission 6. The driving force transmitting system 8 includes a differential gear which distributes the driving force to a pair of driving wheels 12, and a final gear.

The above hybrid vehicle 1 can switch a traveling mode by switching between an engagement and a disengagement of the first clutch CL1. The hybrid vehicle 1 comprises a first traveling mode in which the first clutch CL1 is set to a disengaged state and the hybrid vehicle 1 travels by using the torque of the electric motor 4 without using the torque of the engine 2, and a second traveling mode in which the first clutch CL1 is set to an engaged state and the hybrid vehicle 1 travels by using at least the torque of the engine 2. The first traveling mode is a so-called EV (electric vehicle) traveling mode. The second traveling mode is an engine traveling mode using only the torque of the engine 2, or a hybrid traveling mode using both the torque of the engine 2 and the torque of the electric motor 4. The second clutch CL2 is basically set to the engaged state in both the first traveling mode and the second traveling mode, but is set to the disengaged state (specifically, a ship state) at the time of switching between the first traveling mode and the second traveling mode.

Figure 2:
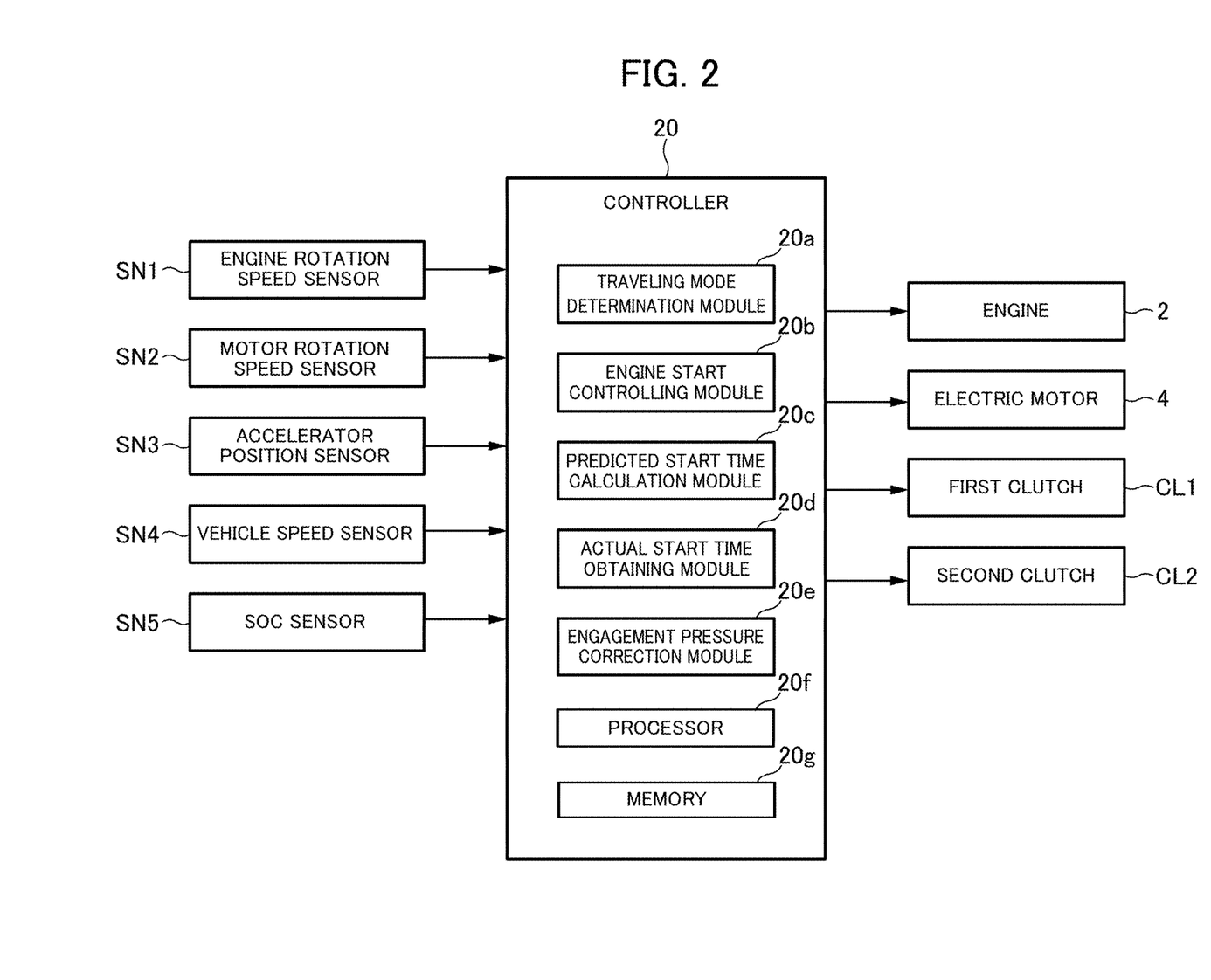
FIG. 2 is a block diagram depicting an electrical configuration of the hybrid vehicle control system in the present embodiment.

Next, FIG. 2 is a block diagram depicting an electrical configuration of the hybrid vehicle control system in this embodiment.

As shown in FIG. 2, a controller 20 receives various input signals as follows: a signal from an engine rotation speed sensor SN1 for detecting an engine rotation speed of the engine 2; a signal from a motor rotation speed sensor SN2 for detecting a motor rotation speed of the electric motor 4; a signal from an accelerator position sensor SN3 for detecting a relative position of an accelerator pedal which corresponds to a degree of depression of the accelerator pedal; a signal for a vehicle speed sensor SN4 for detecting a vehicle speed of the hybrid vehicle 1; and a signal from a SOC sensor SN5 for detecting a state of charge (SOC) of the battery 5. Specifically, the engine rotation speed sensor SN1 is configured by a crank angle sensor for detecting a crank position (crank angle) of a crankshaft in the engine 2.

The controller 20 is a controller comprised of a circuitry and based on a well-known microcomputer, and comprises: a processor 20f serving as a central processing unit (CPU) for executing a program; memory 20g composed of, e.g., random access memory (RAM) and read-only memory (ROM) and capable of storing therein a program and data; and an input-output bus for inputting and outputting electric signals.

In particular, the controller 20 provides control signals to the engine 2, the electric motor 4, the first clutch CL1 and the second clutch CL2 to control them, based on the detected signal by the above sensors SN1 to SN5. For example, the controller 20 performs a control for adjusting an ignition timing, a fuel injection timing and a fuel injection amount, and a control for adjusting the rotation speed and the torque of the electric motor 4, and a control for switching between the engagement and disengagement of the first and second clutches CL1, CL2 (including a control for adjusting the engagement pressure (clutch engagement pressure) applied to the first and second clutches CL1, CL2). Specifically, the controller 20 controls an ignition plug, a fuel injector and a throttle valve in the engine 2, controls the electric motor 4 via the inverter, and control the first and second clutches CL1, CL2 via a hydraulic control circuit.

Further, in the present embodiment, the controller 20 comprises a traveling mode determination module 20a, an engine start controlling module 20b, a predicted start time calculation module 20c, an actual start time obtaining module 20d, and an engagement pressure correction module 20e. These modules are executed by the processor 20f to perform their respective functions and are stored in the memory 20g as software. The traveling mode determination module 20a determines whether or not to switch the traveling mode of the hybrid vehicle 1 from the first traveling mode to the second traveling mode, based on the detected signals by the above sensors SN1 to SN5. The engine start controlling module 20b performs a control for an engine start by applying the engagement pressure to the first clutch CL1 so as to change the first clutch CL1 from the disengaged state to the engaged state, and by cranking the engine 2 by the electric motor 4, when the traveling mode determination module 20a determines to switch the traveling mode of the hybrid vehicle 1 from the first traveling mode to the second traveling mode. Hereinafter, the above control for the engine start is referred to as "engine start control."

The predicted start time calculation module 20c predicts, based on the crank position during the engine stop before the engine start control, the time from the start of the engine start control until the engine 2 is started by the engine start control (i.e., the predicted start time calculation module 20c calculates the predicted start time). The actual start time obtaining module 20d obtains, based on the detected signal by the engine rotation speed sensor SN1, the time from the start of the engine start control until the engine 2 is actually started by the engine start control (i.e., the actual start time obtaining module 20d obtains the actual start time). The engagement pressure correction module 20e corrects the engagement pressure (clutch engagement pressure) which is applied to the clutch at the time of performing the engine start control by the engine start controlling module 20b the next time, based on the time difference between the actual start time and the predicted start time. In other words, the engagement pressure correction module 20e learns the clutch engagement pressure of the first clutch CL1 based on the time difference. Typically, the engagement pressure correction module 20e corrects the clutch engagement pressure so as to decrease the clutch engagement pressure the next time that the engine 2 is started, when the actual start time is shorter than the predicted start time.

<Control of Clutch Engagement Pressure>

Next, the control content performed by the controller 20 in the present embodiment will be described. In the present embodiment, when the engine 2 starts in order to switch the traveling mode of the hybrid vehicle 1 from the first traveling mode to the second traveling mode, the controller 20 performs the control for applying a predetermined engagement pressure (clutch engagement pressure) to the first clutch CL1 so as to change the first clutch CL1 from the disengaged state to the engaged state. Specifically, in the present embodiment, the controller 20 corrects the clutch engagement pressure by the learning, so as to apply an optimum clutch engagement pressure to the first clutch CL1.

Figure 3:
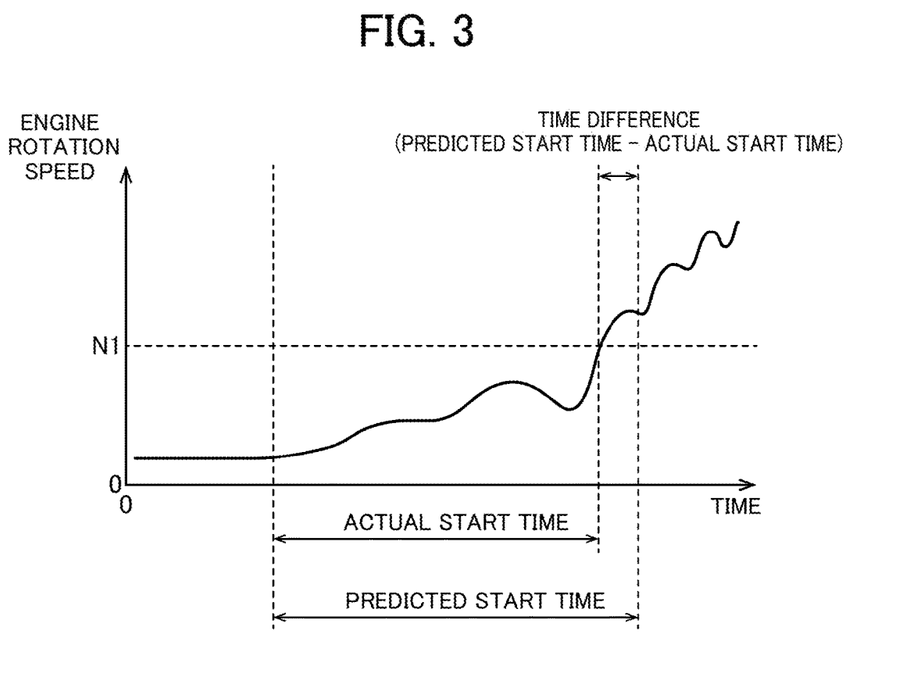
FIG. 3 is an explanatory diagram of an outline of a correction of a clutch engagement pressure in the present embodiment.

First, an outline of the correction of the clutch engagement pressure in the present embodiment will be described with reference to FIG. 3. In FIG. 3, a horizontal axis shows time, and a vertical axis shows an engine rotation speed. Specifically, FIG. 3 shows an example of a time change of the engine rotation speed when the engine start control is performed in order to switch the traveling mode of the hybrid vehicle 1 from the first traveling mode to the second traveling mode.

In the present embodiment, as shown in FIG. 3, the controller 20 obtains the predicted start time and the actual start time by the engine start control, and then corrects the clutch engagement pressure of the first clutch CL1 at the time of starting the engine 2, based on the time difference between the actual start time and the predicted start time. Specifically, the controller 20 corrects (learns) the clutch engagement pressure by a feedback control based on the magnitude of the time difference between the actual start time and the predicted start time. The reason for correcting the clutch engagement pressure in this way is as follows.

When the engine 2 is started in order to switch the traveling mode from the first traveling mode to the second traveling mode, it is desirable to apply an appropriate engagement pressure to the first clutch CL1. This is because it takes a long time to start the engine 2 (the engine 2 may not start in some cases) if the clutch engagement pressure is too low, while fuel efficiency deteriorates due to wasteful consumption of energy if the clutch engagement pressure is too high. That is, there is an optimum clutch engagement pressure for properly starting the engine 2. It is thought that the optimum clutch engagement pressure varies depending on the crank position (crank stop position) during the engine stop before the engine start, accuracy of the sensors used for the engine start, assembly accuracy of engine parts, a time-based deterioration, and parts variation. Therefore, it is difficult to accurately obtain the optimum clutch engagement pressure. Accordingly, the conventional techniques prioritize the engine start by applying the clutch engagement pressure that is considered to be sufficient to start the engine 2 (in other words, the clutch engagement pressure that is higher than the optimum engagement pressure), without obtaining the optimum clutch engagement pressure. As a result, the above deterioration in fuel efficiency occurs due to the application of an unnecessarily high clutch engagement pressure.

Accordingly, in the present embodiment, in order to suppress the deterioration in fuel efficiency, the controller 20 corrects the clutch engagement pressure by learning, so as to optimize the clutch engagement pressure applied to the first clutch CL1. Specifically, the controller 20 corrects the clutch engagement pressure which is applied the next time that the engine 2 starts, based on the time difference between the predicted start time and the actual start time by the engine start control. As shown in FIG. 3, the controller 20 uses the timing at which the engine rotation speed reaches a predetermined rotation speed N1, as the timing at which the start of the engine 2 ends, in order to obtain the predicted start time and the actual start time. In consideration of the characteristic that the detection accuracy of the engine rotation speed sensor SN1 is difficult to be ensured in the low speed range, the rotation speed at which the detection accuracy of the engine rotation speed sensor SN1 can be ensured is applied to the predetermined rotation speed N1. For example, about 400 to 600 rpm is applied to the predetermined rotation speed N1.

Next, with reference to FIGS. 4 to 10, the control of the clutch engagement pressure in the present embodiment will be described in detail.

Figure 4:
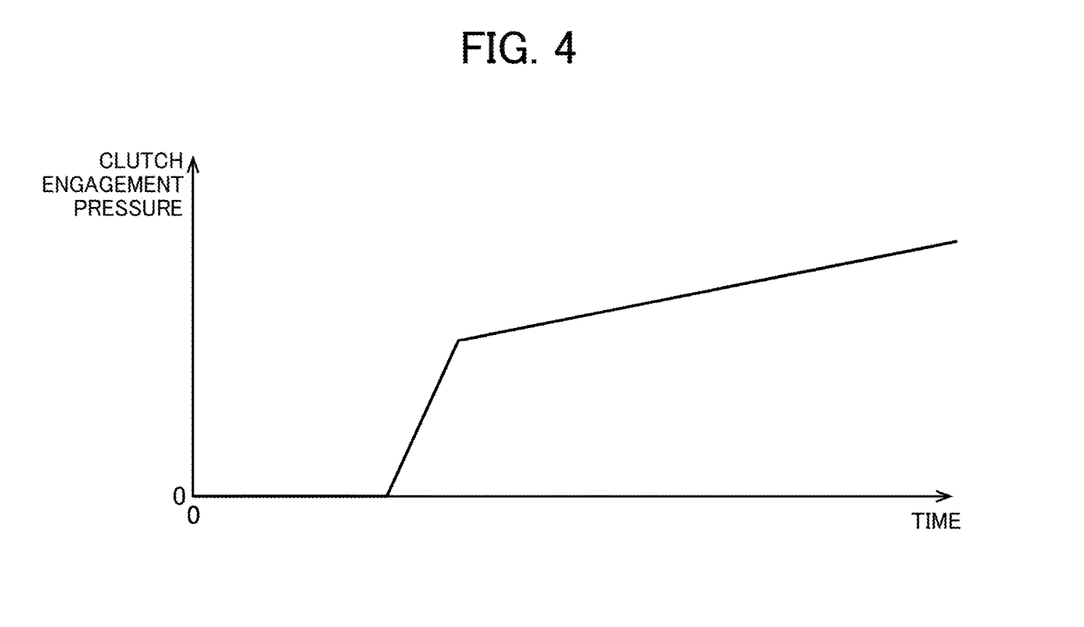
FIG. 4 shows an example of the clutch engagement pressure applied to a first clutch during an engine start control, in the present embodiment.

First, FIG. 4 shows an example of the clutch engagement pressure applied to the first clutch CL1 during the engine start control, in the present embodiment. In FIG. 4, a horizontal axis shows time, and a vertical axis shows a clutch engagement pressure. The clutch engagement pressure corresponds to the torque (clutch transmission torque) transmitted from the electric motor 4 to the engine 2 via the first clutch CL1 when the engine 2 is started. As shown in FIG. 4, in the present embodiment, the controller 20 rapidly increases the clutch engagement pressure at the start of the engine start control, and then gradually increases the clutch engagement pressure. The control of the clutch engagement pressure is performed in order to ensure a quick start of the engine 2 by quickly applying the clutch engagement pressure to the first clutch CL1 first, and in order to ensure the detection accuracy of the engine rotation speed sensor SN1 when the clutch engagement pressure is being gradually increased, i.e., in order to obtain the accurate engine rotation speed based on the signal from the engine rotation speed sensor SN1 (the engine rotation speed is used for obtaining the actual start time by the engine start control).

Figure 5:
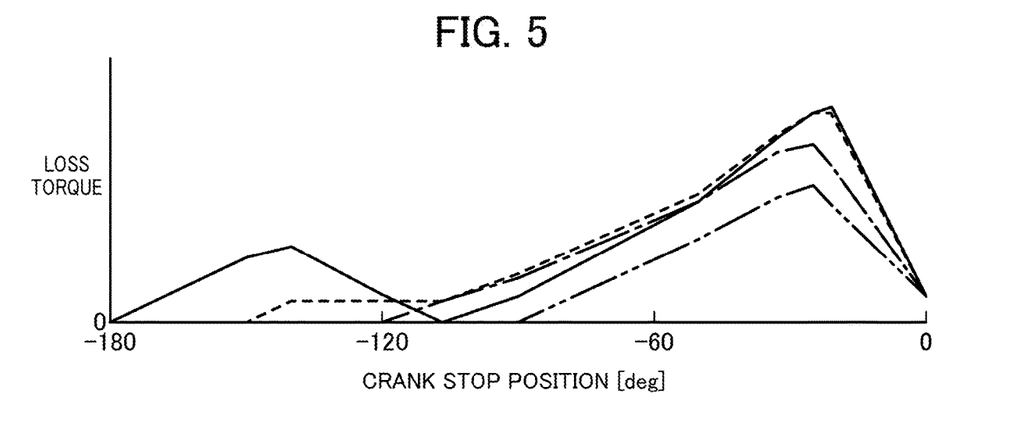
FIG. 5 is an explanatory diagram of a relationship between a crank stop position before the engine start control and a loss torque during the engine start control.

Next, FIG. 5 shows a relationship between a crank stop position before the engine start control and a loss torque in the engine 2 during the engine start control. In FIG. 5, a horizontal axis shows the crank stop position [deg] and a vertical axis shows the loss torque. The loss torque corresponds to the torque required to start the engine 2, i.e., the torque required to rotate the crankshaft of the engine 2. Further, each line in FIG. 5 indicates how the loss torque changes according to an advance of the crank position for each of a plurality of specific crank stop positions (−180 deg, −150 deg, −120 deg, −90 deg). In other words, each line in FIG. 5 indicates a locus of the loss torque during the rotation of the crankshaft. For example, the solid line graph shows the change of the loss torque when the crank stop position is −180 deg. In a typical example, the loss torque as shown in FIG. 5 is defined for each cylinder of the engine 2 (multi-cylinder engine) having a plurality of cylinders. In this case, the sum of the loss torques of all cylinders is the torque required to start the engine 2.

As shown in FIG. 5, it can be seen that the torque (loss torque) required to start the engine 2 changes in accordance with the crank stop position before the engine start control. Therefore, the optimum value of the torque (clutch transmission torque) transmitted from the electric motor 4 to the engine 2 via the first clutch CL1 at the time of starting engine 2, that is, the optimum clutch engagement pressure to be applied to the first clutch CL1 at the time of starting engine 2 changes depending on the crank stop position before the engine start control.

Therefore, in the present embodiment, the controller 20 sets the clutch engagement pressure in accordance with the crank stop position before the engine start control in order to efficiently start the engine 2 while ensuring the fuel efficiency at the time of starting the engine 2. Basically, the controller 20 makes the clutch engagement pressure applied to the first clutch CL1 large, at the crank stop position where the loss torque is high. When the loss torque is defined for each cylinder as described above, the controller 20 sums up the loss torques of all cylinders, and makes the clutch engagement pressure applied to the first clutch CL1 large, at the crank stop position where the total value is large. In a typical example, the optimum clutch engagement pressure (the clutch engagement pressure that can efficiently start the engine 2 while ensuring the fuel efficiency at the time of starting the engine 2) according to the crank stop position is preliminarily obtained by experiments or simulations, so as to create a map in which the optimum clutch engagement pressure is associated with the crank stop position, and the controller 20 reads the clutch engagement pressure according to the crank stop position before the engine start control by using the map, so as to perform the control for applying the read clutch engagement pressure to the first clutch CL1.

Figure 6:
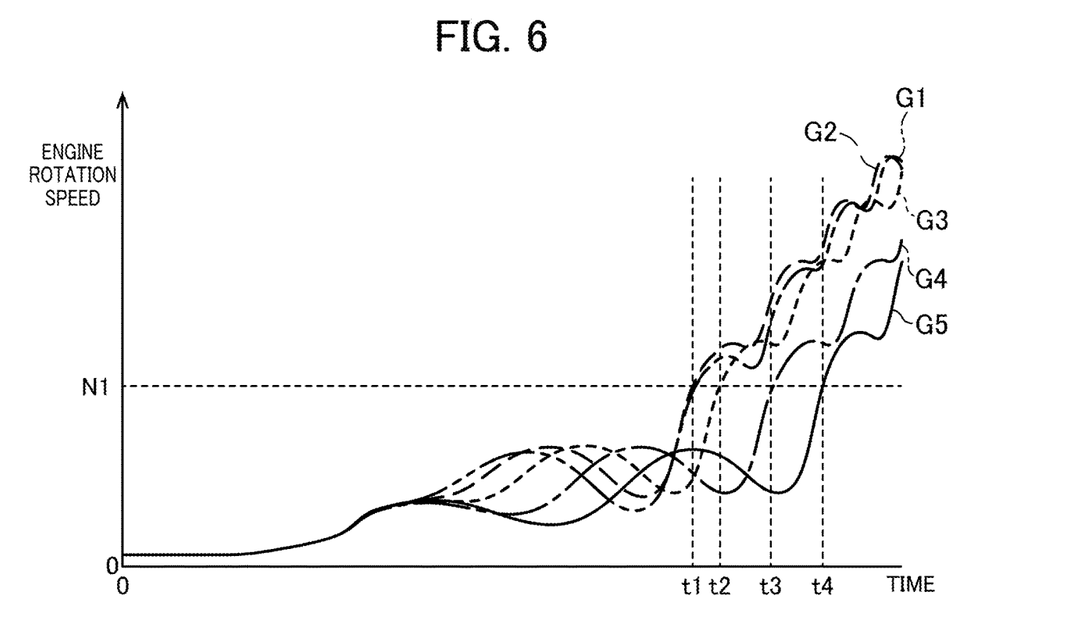
FIG. 6 is an explanatory diagram of a difference in a start time of the engine due to a difference in the crank stop positions before the engine start control.

Next, FIG. 6 is an explanatory diagram of a difference in start time of the engine 2 due to a difference in the crank stop positions before the engine start control. In FIG. 6, a horizontal axis shows time, and a vertical axis shows an engine rotation speed. Specifically, graphs G1 to G5 in FIG. 6 show the time changes of the engine rotation speed when the engine start control is performed for different crank stop positions. For example, the graphs G1, G2, G3, G4, and G5 show the time changes of the engine rotation speed due to the engine start control when the crank stop position is 160 deg, 170 deg, 180 deg, 190 deg, and 200 deg, respectively.

As shown in FIG. 6, it can be seen that the time (start time) when the engine 2 is started by the engine start control, that is, the time at which the engine rotation speed reaches the predetermined rotation speed N1 changes depending on the difference in the crank stop position. Specifically, the engine 2 is started at time t1 at the crank stop position of the graphs G1 and G2, and the engine 2 is started at time t2 at the crank stop position of the graph G3, and the engine 2 is started at time t3 at the crank stop position of the graph G4, and the engine 2 is started at time t4 at the crank stop position of the graph G5 (t1<t2<t3<t4). Thus, the start time of the engine 2 changes depending on the crank stop position. This is because, as shown in FIG. 5, the loss torque (torque required to start the engine 2) changes depending on the crank stop position. The start time of the engine 2 becomes long, at the crank stop position where the loss torque is high. In the present embodiment, the controller 20 obtains the predicted start time and the actual start time as for the start time by the engine start control that changes depending on the crank stop position, and corrects the clutch engagement pressure according to the crank stop position based on the time difference between the predicted start time and the actual start time.

Figure 7:
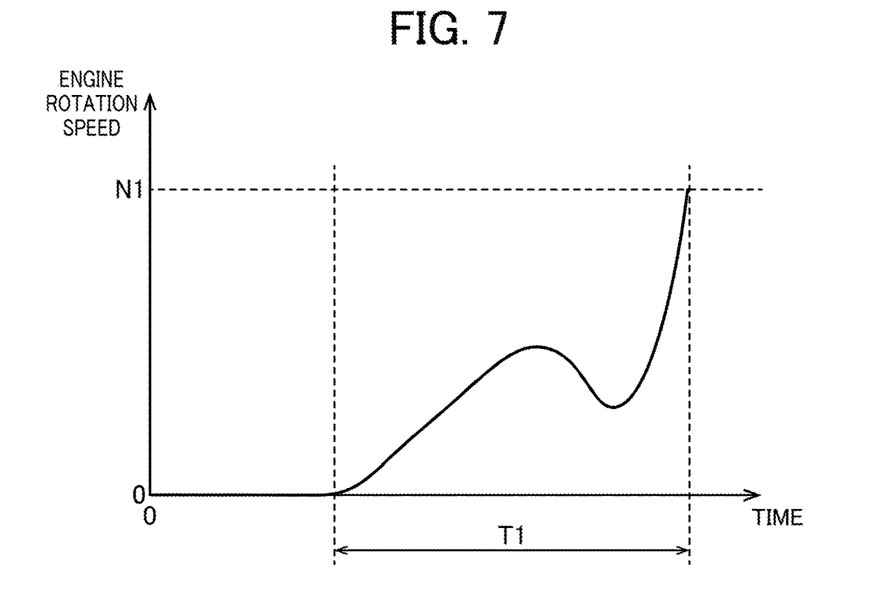
FIG. 7 is an explanatory diagram of a predicted start time by the engine start control in the present embodiment.

Next, FIG. 7 is an explanatory diagram of the predicted start time by the engine start control in the present embodiment. In FIG. 7, a horizontal axis shows time, and a vertical axis shows an engine rotation speed. Specifically, FIG. 7 shows an example of the time change when it is predicted that the engine 2 starts after time T1 has elapsed from the start of engine start control (i.e., the engine rotation speed reaches the predetermined rotation speed N1), that is, when the time T1 is calculated as the predicted start time. As described above, the start time of the engine 2 changes in accordance with the crank stop position (FIG. 6), and this is because the loss torque (torque required to start the engine 2) changes in accordance with the crank stop position (FIG. 5).

Therefore, in the present embodiment, the controller 20 calculates the predicted start time based on the crank stop position before the engine start control. Basically, the controller 20 calculates a long predicted start time at the crank stop position where the loss torque is high. When the loss torque is defined for each cylinder as described above, the controller 20 sums up the loss torques of all cylinders, and calculates a long predicted start time at the crank stop position where the total value is large. In a typical example, the predicted start time according to the crank stop position is preliminarily obtained by experiments or simulations (i.e., the predicted start time for which the optimum clutch engagement pressure according to the crank stop position is used is preliminarily obtained), so as to create a map in which the predicted start time is associated with the crank stop position, and the controller 20 reads the predicted start time according to the crank stop position before the engine start control by using the map.

The time change of the engine rotation speed shown in FIG. 7 corresponds to the predicted time change of the engine rotation speed. When the above predicted start time is calculated, it is not necessary to predict the time change of the engine speed as shown in FIG. 7, and the predicted start time may be calculated directly from the crank stop position.

Figure 8:
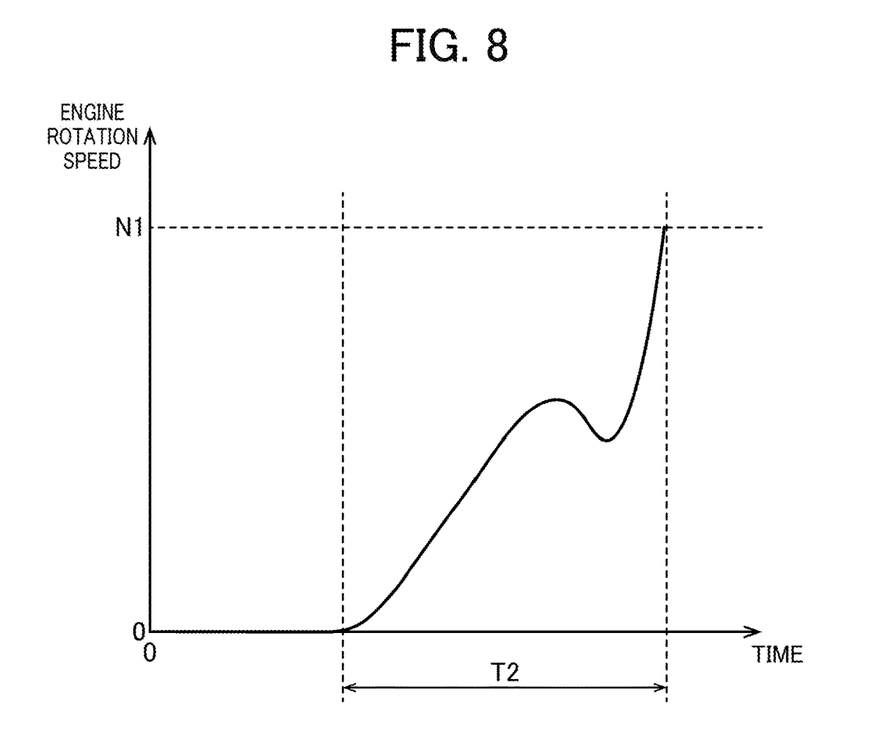
FIG. 8 is an explanatory diagram of an actual start time by the engine start control in the present embodiment.

Next, FIG. 8 is an explanatory diagram of the actual start time by the engine start control in the present embodiment. In FIG. 8, a horizontal axis shows time, and a vertical axis shows an engine rotation speed. Specifically, FIG. 8 shows such a situation that the engine 2 is actually started after time T2 has elapsed from the start of the engine start control, that is, T2 is obtained as the actual start time. In the present embodiment, the controller 20 obtains the time from the start of performing the engine start control to the time when the engine rotation speed detected by the engine rotation speed sensor SN1 reaches the predetermined speed N1, as the actual start time T2.

Figure 9:
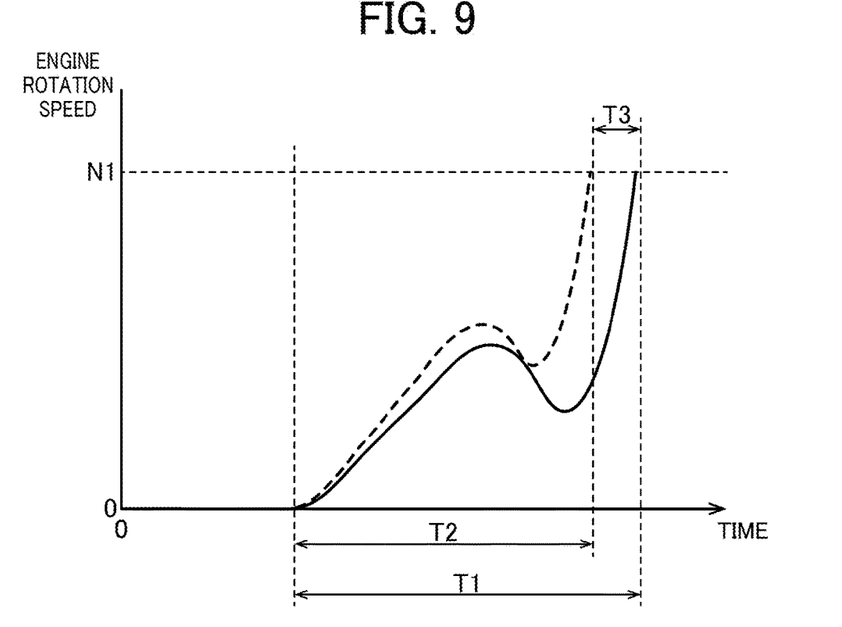
FIG. 9 is an explanatory diagram of a time difference between the predicted start time and the actual start time by the engine start control, in the present embodiment.

Next, FIG. 9 is an explanatory diagram of a time difference between the predicted start time and the actual start time by the engine start control, in the present embodiment. In FIG. 9, a horizontal axis shows time, and a vertical axis shows an engine rotation speed. Specifically, FIG. 9 is a diagram in which the predicted start time T1 shown in FIG. 7 and the actual start time T2 shown in FIG. 8 are overlapped. As shown in FIG. 9, the controller 20 obtains the time difference T3 between the predicted start time T1 and the actual start time T2, and corrects the clutch engagement pressure applied to the first clutch CL1 the next time that the engine 2 is started, based on the time difference T3.

In the present embodiment, since the start time of the engine 2 changes depending on the crank stop position, the predicted start time T1 is calculated by appropriately taking the crank stop position into consideration. However, even though the predicted start time T1 is calculated in this way, the time difference T3 between the predicted start time T1 and the actual start time T2 may occur. It is considered that this is due to the accuracy of the sensors used for the engine start, the assembly accuracy of the engine parts, the time-based deterioration, and the parts variation. Therefore, in the present embodiment, in order to properly consider such various factors, the time difference T3 between the predicted start time T1 and the actual start time T2 corresponding to the crank stop position is obtained at any time, and the clutch engagement pressure applied to the first clutch CL1 is appropriately corrected according to the time difference T3.

Figure 10:
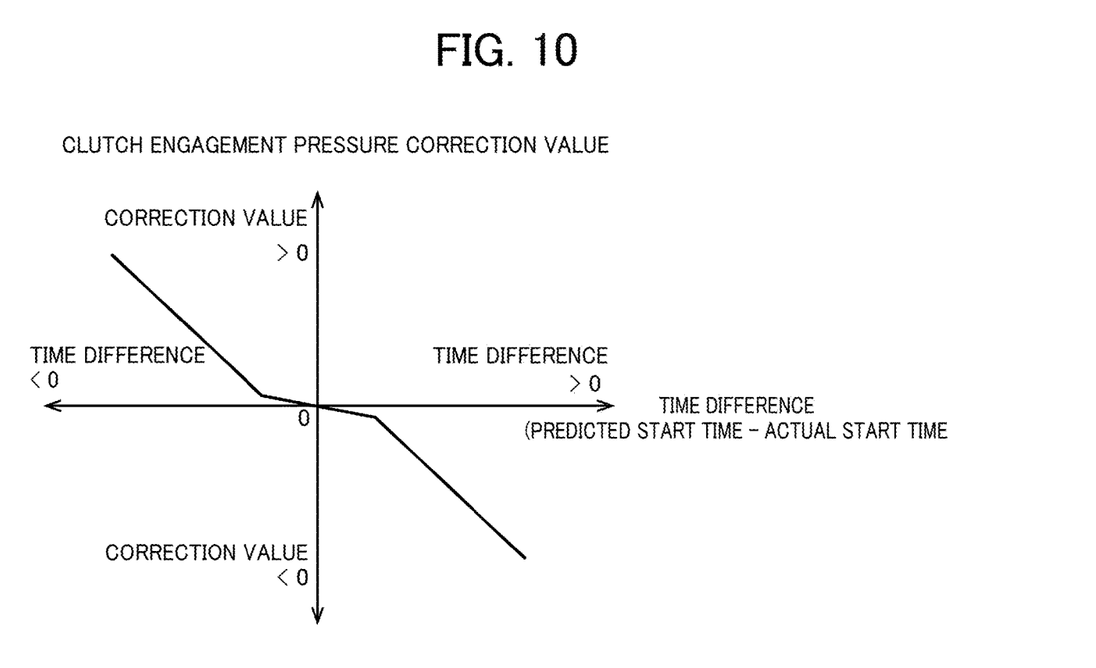
FIG. 10 is an explanatory diagram of a clutch engagement pressure correction value according to the time difference between the predicted start time and the actual start time, in the present embodiment.

Next, FIG. 10 shows a correction value of the clutch engagement pressure (clutch engagement pressure correction value) according to the time difference between the predicted start time and the actual start time (predicted start time−actual start time), in the present embodiment. In FIG. 10, a horizontal axis shows the time difference between the predicted start time and the actual start time, and a vertical axis shows the clutch engagement pressure correction value. FIG. 10 corresponds to a map of the clutch engagement pressure correction value defined in accordance with the time difference between the predicted start time and the actual start time. The clutch engagement pressure correction value is a value for obtaining the clutch engagement pressure which is applied the next time that the engine 2 is started.

The map shown in FIG. 10 defines a negative clutch engagement pressure correction value (<0) in a region where the predicted start time is longer than the actual start time (time difference>0). Therefore, when the predicted start time is longer than the actual start time, the clutch engagement pressure is decreased the next time that the engine 2 is started. On the other hand, the map defines a positive clutch engagement pressure correction value (>0) in a region where the predicted start time is shorter than the actual start time (time difference<0). Therefore, when the predicted start time is shorter than the actual start time, the clutch engagement pressure is increased the next time that the engine 2 is started. Further, in both the region where the predicted start time is longer than the actual start time and the region where the predicted start time is shorter than the actual start time, the map is defined such that an absolute value of the clutch engagement pressure correction value increases as an absolute value of the time difference between the predicted start time and the actual start time increases. Accordingly, as a deviation of the predicted start time with respect to the actual start time becomes larger, the clutch engagement pressure is greatly corrected by the clutch engagement pressure correction value the next time that the engine 2 is started.

<Engine Start Control Process>

Figure 11:
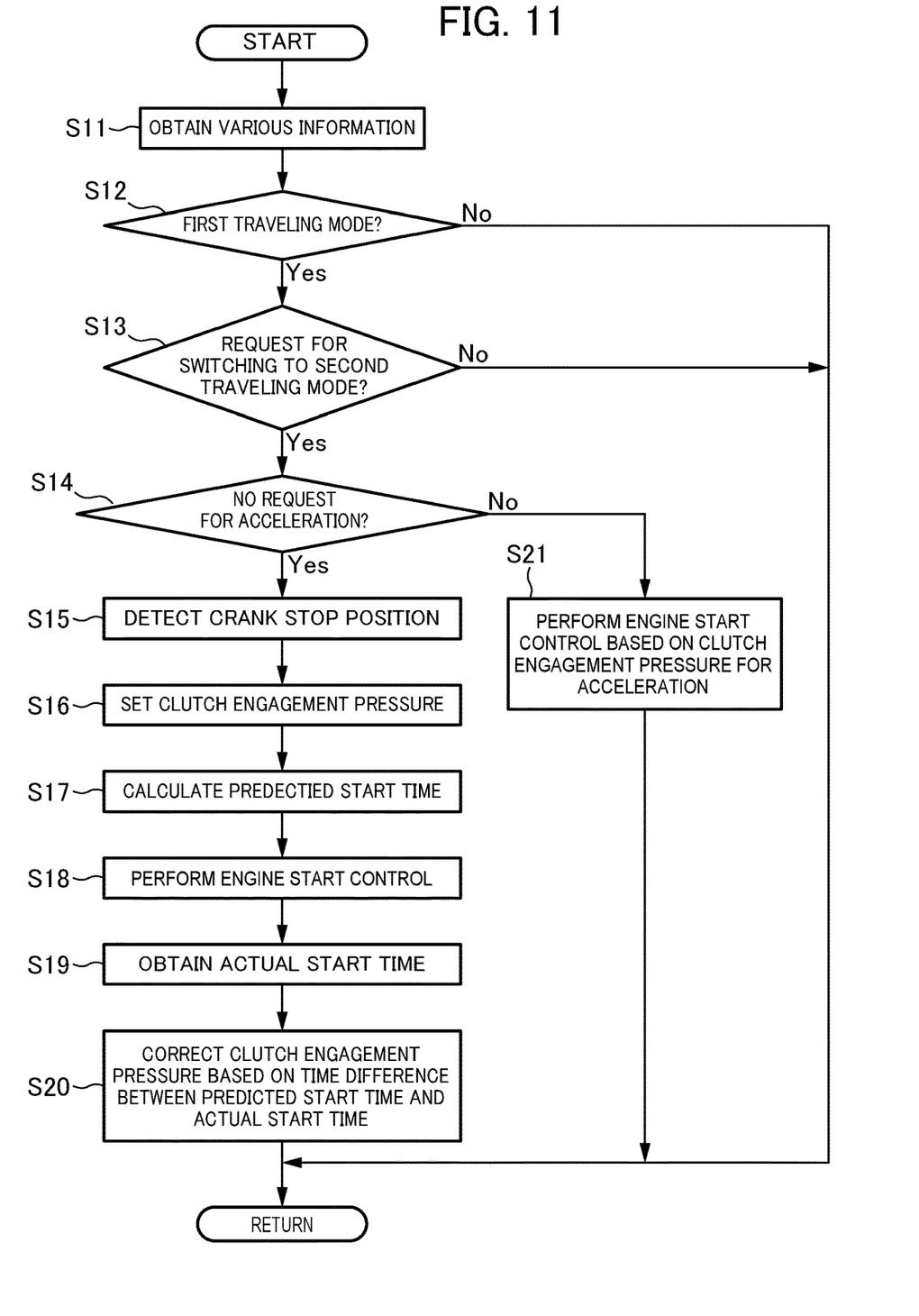
FIG. 11 is a flowchart showing an engine start control process in the present embodiment.

Next, with reference to FIG. 11, a specific process performed in the engine start control (including the above-mentioned clutch engagement pressure control) in the present embodiment will be described. FIG. 11 is a flowchart showing an engine start control process in the present embodiment. The engine start control process is repeatedly executed by the controller 20 at a predetermined cycle.

First, when the engine start control process shown in FIG. 11 is started, in step S11, the controller 20 obtains the various information of the hybrid vehicle 1, including the information corresponding to the detection signals by the above sensors SN1 to SN5. Then, the controller 20 goes to step S12.

In step S12, the controller 20 determines whether or not the current traveling mode is the first traveling mode (EV traveling mode). For example, the controller 20 makes the determination based on the control signals output to the electric motor 4, the first clutch CL1 and the second clutch CL2. In this example, the controller 20 determines that the current traveling mode is the first traveling mode when the first clutch CL1 is released, the second clutch CL2 is engaged, and the torque is output from the electric motor 4. When the controller 20 determines that the current traveling mode is the first traveling mode (step S12: Yes), the controller 20 goes to step S13. On the other hand, when the controller 20 determines that the current traveling mode is not the first traveling mode (step S12: No), typically when the current traveling mode is the second traveling mode, the controller 20 ends the engine start control process. In this case, since the engine 2 has been already operated, it is not necessary to start the engine 2 by performing the engine start control.

In step S13, the controller 20 determines whether or not a request for switching from the first traveling mode to the second traveling mode is issued, in other words, whether or not a request for starting the engine 2 is issued. As one example, the controller 20 determines that the request for switching to the second traveling mode is issued, when the SOC of the battery 5 detected by the SOC sensor SN5 is less than a predetermined value (for example, a lower limit value of the SOC at which the battery 5 should be charged, or the SOC at which the electric power of the battery 5 is prohibited from being drawn out, which are defined from the viewpoint of protection of the battery 5). As another example, the controller 20 determines that the request for switching to the second traveling mode is issued, when an air conditioner switch of the hybrid vehicle 1 is turned on by the driver. As still another example, the controller 20 determines that the request for switching to the second traveling mode is issued, when a relatively strong request for accelerating is issued by the driver (for example, when the accelerator pedal is greatly depressed by the driver). When the controller 20 determines that the request for switching from the first traveling mode to the second traveling mode is issued (step S13: Yes), the controller 20 goes to step S14. In contrast, when the controller 20 determines that the request for switching from the first traveling mode to the second traveling mode is not issued (step S13: No), the controller 20 ends the engine start control process. In this case, since the first traveling mode is maintained, it is not necessary to start the engine 2 by performing the engine start control.

In step S14, the controller 20 determines whether or not a request for accelerating is not issued by the driver. Specifically, the controller 20 determines the request for accelerating by determining whether or not the amount of change in the relative position of the accelerator pedal detected by the accelerator position sensor SN3 is equal to or greater than a predetermined amount. As a result, when the controller 20 determines that the request for accelerating is not issued (step S14: Yes), the controller 20 goes to step S15.

In step S15, the controller 20 obtains the crank position (crank stop position) during the engine stop before the engine start control based on the signal from the engine rotation speed sensor SN1 as the crank angle sensor.

Next, in step S16, the controller 20 sets the clutch engagement pressure applied to the first clutch CL1 based on the crank stop position obtained in step S15. Specifically, the controller 20 refers to the preliminarily created map in which the optimum clutch engagement pressure is associated with the crank stop position, and reads the clutch engagement pressure corresponding to the crank stop position obtained in step S15, so as to set the clutch engagement pressure to the first clutch CL1. This map is created by preliminarily obtaining the optimum clutch engagement pressure according to the crank stop position, especially, the clutch engagement pressure that can efficiently start the engine 2 while ensuring the fuel efficiency at the time of starting the engine 2, by the experiments or the simulations. In particular, the map is defined such that the clutch engagement pressure becomes large at the crank stop position where the loss torque is high.

Next, in step S17, the controller 20 calculates the time (predicted start time) from the start of the engine start control until the engine 2 is started by the engine start control, based on the crank stop position obtained in step S15. Specifically, the controller 20 refers to the preliminarily created map in which the predicted start time is associated with the crank stop position, and obtains the predicted start time corresponding to the crank stop position obtained in step S15. This map is created by preliminarily obtaining the predicted start time according to the crank stop position, especially, the predicted start time acquired when the optimum clutch engagement pressure (i.e., the clutch engagement pressure that can efficiently start the engine 2 while ensuring the fuel efficiency at the time of starting the engine 2) according to the crank stop position is applied, by the experiments or the simulations. In particular, the map is defied such that the predicted start time becomes long at the crank stop position where the loss torque is high. The above process in step S17 may be performed after the start of the engine start control in step S18 described below.

Next, in step S18, the controller 20 performs the engine start control for starting (restarting) the engine 2. Specifically, the controller 20 performs the control to apply the clutch engagement pressure set in step S16 to the first clutch CL1 so as to change the first clutch CL1 from the disengaged state to the engaged state, and performs the control to crank the engine 2 by the torque of the electric motor 4.

Next, in step S19, the controller 20 obtains the time (actual start time) from the start of the engine start control until the engine 2 is actually started by the engine start control. Specifically, the controller 20 obtains the time from the start of performing the engine start control, to the time when the engine rotation speed detected by the engine rotation speed sensor SN1 reaches the predetermined rotation speed N1, as the actual start time.

Next, in step S20, the controller 20 corrects the clutch engagement pressure applied the next time that the engine 2 is started, based on the time difference between the predicted start time calculated in step S17 and the actual start time obtained in step S19. Specifically, the controller 20 refers to the preliminarily created map in which the clutch engagement pressure correction value is associated with the time difference between the predicted start time and the actual start time (FIG. 10), and reads the clutch engagement pressure correction value corresponding to the time difference between the predicted start time calculated in step S17 and the actual start time obtained in step S19. Then, the controller 20 corrects the clutch engagement pressure which is used the next time that the engine 2 is started, based on the clutch engagement pressure correction value. In particular, when the predicted start time is longer than the actual start time, the controller 20 uses the negative clutch engagement pressure correction value so as to decrease the clutch engagement pressure the next time that the engine 2 is started. On the other hand, when the predicted start time is shorter than the actual start time, the controller 20 uses the positive clutch engagement pressure correction value so as to increase the clutch engagement pressure the next time that the engine 2 is started. Further, the controller 20 makes the clutch engagement pressure correction value (absolute value) larger as the time difference (absolute value) between the predicted start time and the actual start time becomes larger, so as to greatly correct the clutch engagement pressure which is used the next time that the engine 2 is started. After step S20, the controller 20 ends the engine start control process.

The clutch engagement pressure corrected in the above-mentioned way is used when the clutch engagement pressure is set in step S16 in the next engine start control process. Specifically, as described above, since the clutch engagement pressure is obtained by using the map defined in accordance with the crank stop position, the correction by the clutch engagement pressure correction value may be applied to the map. On the other hand, since the predicted start time is calculated based on the crank stop position (step S17), the predicted start time may also be corrected in accordance with the correction of the clutch engagement pressure by the clutch engagement pressure correction value. In particular, the map in which the predicted start time is associated with the crank stop position may be corrected in accordance with the clutch engagement pressure correction value. Therefore, the time difference between the predicted start time and the actual start time which is calculated in the future will be decreased.

On the other hand, when the controller 20 determines in step S14 that the request for accelerating is issued by the driver (step S14: No), the controller 20 goes to step S21. In step S21, the controller 20 sets the clutch engagement pressure used for the acceleration (clutch engagement pressure for acceleration) to the first clutch CL1 and performs the engine start control. In this case, in order to prioritize the acceleration request from the driver and promptly start the engine 2, the controller 20 uses the clutch engagement pressure for acceleration which is larger than the above clutch engagement pressure according to the crank stop position (i.e., the clutch engagement pressure that can efficiently start the engine 2 while ensuring the fuel efficiency at the time of starting the engine 2). The clutch engagement pressure for acceleration is a clutch engagement pressure that is effective for promptly starting the engine 2 in order to appropriately satisfy the acceleration request from the driver, and is defined by experiments or simulations in advance. The controller 20 performs the control to apply the above clutch engagement pressure for acceleration to the first clutch CL1 and performs the control to crank the engine 2 by the torque of the electric motor 4, in order to start the engine 2. After step S21, the controller 20 ends the engine start control process.

<Functions/Effects>

Next, functions/effects of the present embodiment will be described.

In the present embodiment, when the controller 20 starts the engine 2 in order to switch the traveling mode of the hybrid vehicle 1 from the first traveling mode to the second traveling mode, the controller 20 obtains the predicted start time and the actual start time by the engine start control, and corrects the clutch engagement pressure so as to decrease the clutch engagement pressure applied to the first clutch CL1 the next time that the engine 2 is started, when the actual start time is shorter than the predicted start time. In other words, the controller 20 calculates the predicted start time in consideration of various states, and corrects the clutch engagement pressure applied to the first clutch CL1 by the learning according to the time difference between the predicted start time and the actual start time, specifically, corrects the clutch engagement pressure to decrease the pressure when the actual start time is shorter than the predicted start time. Therefore, it is possible to optimize the clutch engagement pressure used for starting the engine 2 at the time of switching from the first travel mode to the second travel mode, thereby suppressing the deterioration in fuel efficiency due to the application of the clutch engagement pressure more than necessary.

Further, in the present embodiment, the controller 20 calculates the predicted start time based on the crank position (crank stop position) during the engine stop before the switch from the first travel mode to the second travel mode. The start time of the engine 2 greatly changes depending on the crank stop position (see FIG. 6). This is because the torque (loss torque) required to start the engine 2 changes depending on the crank stop position (see FIG. 5). Therefore, in the present embodiment, the controller 20 calculates the predicted start time in consideration of the above change of the start time depending on the crank stop position.

Therefore, it is possible to appropriately calculate the predicted start time in which the influence of the crank stop position is taken into consideration, in other words, the predicted start time can be obtained with high accuracy.

Further, in the present embodiment, when the request for accelerating the hybrid vehicle 1 is issued by the driver at the time of switching from the first traveling mode to the second traveling mode, the controller 20 makes the clutch engagement pressure applied to the first clutch CL1 larger than when the request is not issued. Therefore, the quick start of the engine 2 can be appropriately prioritized. In other words, by starting the engine 2 quickly, the acceleration request from the driver can be appropriately realized.

Further, in the present embodiment, the controller 20 makes the decreased amount (absolute value) of the clutch engagement pressure by the correction, as the difference (absolute value) between the actual start time and the predicted start time becomes larger. Therefore, the clutch engagement pressure can be effectively optimized.

Further, in the present embodiment, the controller 20 determines that the engine start ends when the engine rotation speed reaches the predetermined rotation speed N1, and obtains the predicted start time and the actual start time. Therefore, the accuracy of the predicted start time and the actual start time can be appropriately ensured.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

What is claimed is:

1. A hybrid vehicle control system, comprising:
    an engine;
    an electric motor;
    a clutch configured to switch between a transmission of torque between the engine and the electric motor, and a non-transmission of the torque; and
    a controller configured to control the engine, the electric motor, and the clutch,
    wherein the controller is configured to:
        determine whether or not to switch a traveling mode of a hybrid vehicle from a first traveling mode in which the clutch is set to a disengaged state and the hybrid vehicle travels by using the torque of the electric motor without using the torque of the engine, to a second traveling mode in which the clutch is set to an engaged state and the hybrid vehicle travels by using at least the torque of the engine;
        perform a control for an engine start by applying an engagement pressure to the clutch so as to change the clutch from the disengaged state to the engaged state, and by cranking the engine by the electric motor, when the traveling mode of the hybrid vehicle is determined to be switched from the first traveling mode to the second traveling mode;
        calculate a predicted start time from a start of the control for the engine start to an end of the engine start;
        obtain an actual start time from the start of the control for the engine start to an actual end of the engine start;
        correct the engagement pressure so as to decrease the engagement pressure which is applied to the clutch at the time of performing the control for a subsequent engine start, when the actual start time is shorter than the predicted start time; and
        make the engagement pressure applied to the clutch larger than when a request for accelerating the hybrid vehicle is not issued by a driver, in order to shorten a start time of the engine, under a condition that the traveling mode of the hybrid vehicle is determined to be switched from the first traveling mode to the second traveling mode, when the request for accelerating the hybrid vehicle is issued by the driver.

2. The hybrid vehicle control system according to claim 1, wherein the controller is configured to calculate the predicted start time based on a crank position during an engine stop before the control for the engine start.

3. The hybrid vehicle control system according to claim 1, wherein the controller is configured to correct the engagement pressure so as to make a decreased amount of the engagement pressure larger, as an absolute value of a difference between the actual start time and the predicted start time becomes larger.

4. The hybrid vehicle control system according to claim 2, wherein the controller is configured to correct the engagement pressure so as to make a decreased amount of the engagement pressure larger, as an absolute value of a difference between the actual start time and the predicted start time becomes larger.

5. The hybrid vehicle control system according to claim 1, wherein the controller is configured to use a timing at which an engine rotation speed reaches a given value as the end of the engine start and the actual end of the engine start.

6. The hybrid vehicle control system according to claim 2, wherein the controller is configured to use a timing at which an engine rotation speed reaches a given value as the end of the engine start and the actual end of the engine start.

7. The hybrid vehicle control system according to claim 3, wherein the controller is configured to use a timing at which an engine rotation speed reaches a given value as the end of the engine start and the actual end of the engine start.

8. The hybrid vehicle control system according to claim 4, wherein the controller is configured to use a timing at which an engine rotation speed reaches a given value as the end of the engine start and the actual end of the engine start, and to calculate the predicted start time and obtain the actual start time.

* * * * *